United States Patent [19]

Norton et al.

[11] 4,156,435

[45] May 29, 1979

[54] RELIEF VALVE ASSEMBLIES

[75] Inventors: James F. Norton, Berea; Walter W. Antoniw, Lakewood; John A. Jones; Richard Silagy, both of Parma, all of Ohio

[73] Assignee: The Coca-Cola Company, Atlanta, Ga.

[21] Appl. No.: 691,588

[22] Filed: Jun. 1, 1976

[51] Int. Cl.[2] ............................................. F16K 17/04
[52] U.S. Cl. ................................. 137/240; 137/454.5; 137/543.13
[58] Field of Search ............... 137/454.2, 454.5, 454.4, 137/454.6, 240, 543.13

[56] References Cited

U.S. PATENT DOCUMENTS

3,042,071  7/1962  Van Tuyl ........................ 137/454.5

Primary Examiner—Alan Cohan

[57] ABSTRACT

An improved relief valve assembly includes a metallic housing which is connected with a wall of a container of pressurized liquid. A plastic liner is disposed within the housing cavity and has external thread convolutions which engage internal housing thread convolutions. An outer seal is provided to prevent exposure of the threads to foreign particles in the atmosphere surrounding the container and an inner seal is provided to prevent leakage of liquid between the liner and housing. A valve member within the plastic liner is movable against the influence of a biasing spring from a closed position to an open position under the influence of excessive fluid pressure in the container. To enable the liner and movable valve member to be preassembled and then screwed into the housing cavity, the valve spring and valve member are held in the liner cavity by a base member. The base member is held against movement relative to the liner by a plurality of resiliently deflectable fingers which extend from one end of the liner. In one embodiment of the invention, the relief valve assembly is advantageously cleaned by connecting a socket assembly to the housing of the relief valve assembly and then flowing cleansing fluid from a source of cleansing fluid through the relief valve assembly.

28 Claims, 7 Drawing Figures

FIG. 6

RELIEF VALVE ASSEMBLIES

BACKGROUND OF THE INVENTION

This invention relates generally to a new and improved relief valve assembly and more specifically, to a relief valve assembly which is utilized with a refillable container to limit the pressure in the container and which can be readily cleaned between fillings of the container.

Many relief valve assemblies have been utilized to limit the pressure in various types of containers. Some of these known relief valve assemblies are disclosed in U.S. Pat. Nos. 3,002,648; 1,685,918; 1,459,817 and 132,918.

Although known relief valve assemblies are more or less satisfactory for use in many different environments, difficulty has been encountered in providing a satisfactory relief valve for use in association with a pressurized container of soft drinks or syrup for making soft drinks. This difficulty is due in part to the fact that the relief valve assembly must be exposed to the atmosphere in order to enable it to vent the interior of the container upon the occu-rence of excessive pressures within the container. Since the relief valve assembly is exposed to the atmosphere, dirt and other foreign particles from the atmosphere can enter the relief valve assembly and cause bacteria to grow in cracks and crevices between components of the relief valve assembly. In addition, the interior of the relief valve assembly must be exposed to the syrup in the container and the syrup may seep into the cracks and crevices and also promote the growth of bacteria. Since the soft drink syrup will be consumed without processing in such a manner as to kill bacteria, the growth of any bacteria in association with the relief valve assembly is to be avoided. In addition, when the container is refilled with soft drink syrup, it is desirable to be able to clean the relief valve assembly with a minimum of difficulty.

SUMMARY OF THE PRESENT INVENTION

The present invention provides a new and improved relief valve assembly which is utilized in association with a container under pressure. The relief valve assembly includes a housing which is fixedly mounted on the container and a liner which is threaded into a cavity in the housing. Seals are provided to prevent entry of dirt and other foreign particles in the atmosphere around the container into the joint between the liner and housing and to prevent the leakage of liquid from within the container into the joint between the liner and housing to thereby retard the growth of bacteria. These seals also eliminate the necessity of disassembling the relief valve for cleaning.

In addition to the liner and housing, the relief valve assembly includes a movable valve element and biasing spring which are disposed within the liner. Installation of the liner, valve member and biasing spring in the housing is facilitated by the use of a base or end member to hold the movable valve member and spring in a cavity in the liner.

In one embodiment of the invention, the relief valve housing has an external configuration corresponding to the configuration of a plug element of a plug and socket assembly. A conduit connected with a source of cleansing fluid can be connected with the relief valve assembly by merely connecting a socket at one end of the conduit to the housing for the relief valve assembly. High pressure cleaning fluid is then conducted through the conduit, socket and relief valve assembly to clean the parts of the relief valve assembly with a minimum of difficulty.

Accordingly, it is an object of this invention to provide a new and improved relief valve assembly for use in association with a container of pressurized liquid and wherein the relief valve assembly includes a liner having external threads which engage internal threads on a housing, a pair of seals being provided at opposite ends of the threads to prevent exposure of the threads to either foreign particles from the atmosphere and in one embodiment of the invention to the liquid in the container.

Another object of the invention is to provide a new and improved relief valve assembly having a housing which is connected with a container and a liner unit which can be threaded into the housing and wherein the liner unit includes a liner body, a movable valve member which is received in a valve cavity in the liner body, a valve biasing spring, and a releasable end wall which is held in place by resiliently deflectable fingers connected with the liner body.

Another object of this invention is to provide a new and improved valve assembly having an exterior surface which is shaped to be engaged by an element of a coupling assembly to facilitate connecting the relief valve assembly with a source of cleansing fluid under pressure.

BRIEF DESCRIPTION OF THE DRAWINGS

The foregoing and other objects and features of the present invention will become more apparent upon a consideration of the following description taken in conjunction with the accompanying drawings wherein.

DESCRIPTION OF SPECIFIC PREFERRED EMBODIMENTS OF THE INVENTION

Figures 1, 2, 3, 4, 5, 7:
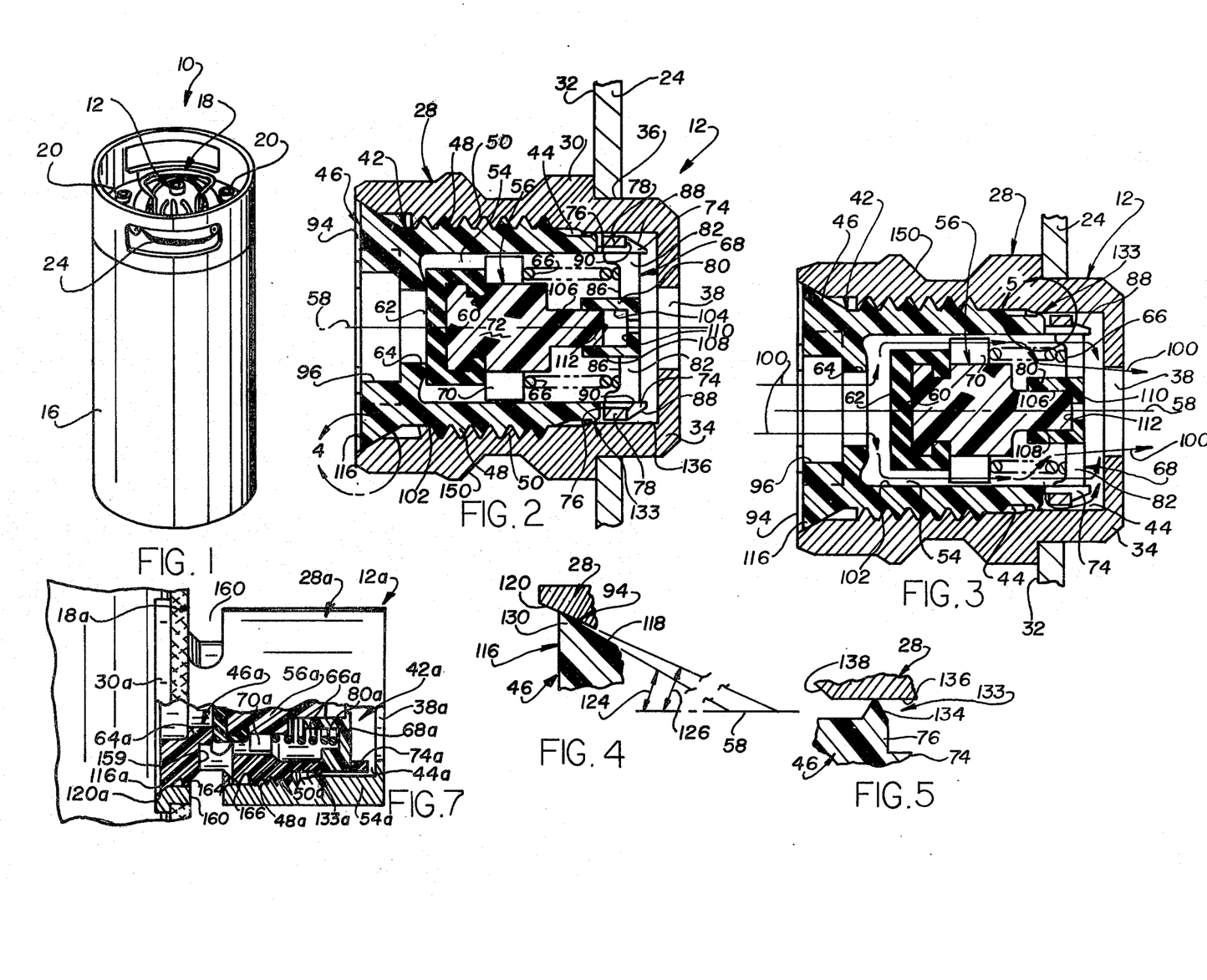
FIG. 1 is an illustration of a container having a relief valve assembly constructed in accordance with the present invention.
FIG. 2 is an enlarged sectional view illustrating the construction of the relief valve assembly utilized in association with the container of FIG. 1, the relief valve assembly being shown in closed condition.
FIG. 3 is a sectional view, generally similar to FIG. 2, illustrating the relief valve assembly in an open condition.
FIG. 4 is an enlarged fragmentary sectional view of the area enclosed by a circle 4—4 in FIG. 2 and illustrating the construction of a seal between a liner and the housing of the relief valve assembly.
FIG. 5 is an enlarged fragmentary, sectional view of the portion of the relief valve assembly enclosed by a circle 5—5 in FIG. 3 and illustrating the construction of a second seal between the liner and the housing of the relief valve assembly.
FIG. 7 (on sheet one of the drawings) is a sectional view of a second embodiment of the invention.

A container 10 of liquid under pressure having a relief valve assembly 12 constructed in accordance with the present invention is illustrated in FIG. 1. Although the container 10 could be utilized with many different types of fluids, the container is utilized in the transporting of soft drink syrups. The container 10 includes a main or body portion 16 and a cover 18 which is releasably connected with the body 16 in a suitable manner. A charging inlet and outlet 20 is mounted on an end wall of the container 10 to enable the liquid in the container to be pressurized and subsequently discharged in a known manner after the cover 18 has been connected with the body 16. Although the relief valve 12 could be mounted on the end wall of the container, it is advantageously mounted on the cover 18 to facilitate cleaning.

The relief valve assembly 12 limits the pressure obtained within the container 10 to a predetermined maximum pressure. If this predetermined maximum pressure is exceeded, the relief valve assembly 12 opens and enables a sufficient volume of fluid pressure to escape from the container 10 to effect a reduction in the pressure within the container to a pressure below the predetermined pressure at which the relief valve assembly is opened.

The relief valve assembly 12 includes a stainless steel housing 28 (see FIG. 2) which is fixedly mounted on the wall 24 of the cover 18. The stainless steel housing 28 has a circular shoulder 30 which engages an inner surface 32 of the cover wall. A generally cylindrical outer end portion 34 of the valve housing 28 projects through a circular opening 36 in the cover wall 24 and is exposed to the atmosphere surrounding the container. The outer end portion 34 of the valve housing 28 has a circular exhaust opening 38 through which the fluid is exhausted to the atmosphere when the relief valve assembly 12 is operated from the closed position in FIG. 2 to the open position in FIG. 3 under the influence of excessive fluid pressure within the container 10.

The relief valve assembly 12 includes a cartridge assembly 42 which is removably mounted within a generally cylindrical housing cavity 44. The cartridge assembly 42 includes a generally cylindrical liner 46 formed of a polymeric material and having external thread convolutions 48 which engage internal thread convolutions 50 formed in the housing 28. The liner 46 has a generally cylindrical valve cavity 54 which is disposed in a coaxial relationship with the housing cavity 44 and the internal and external thread convolutions 48 and 50.

An axially movable valve member 56 is disposed along the central axis 58 of the valve cavity 54 and housing cavity 44. The valve member 56 is made of a polymeric material and is provided with a removable elastomeric seal cap 60 having a circular end face 62 which sealingly engages an annular valve seat 64 which is integrally formed with the liner 46. When the movable valve member 56 is in the closed position of FIG. 2, fluid flow through the relief valve assembly 12 is blocked by sealing engagement of the movable valve member with the valve seat 64.

The movable valve member 56 is urged toward the closed position of FIG. 2 under the influence of a coil spring 66. The coil spring 66 is disposed between a circular base member 68 and radially outwardly projecting guides 70 formed on the body 72 of the movable valve member 56. The base member 68 is formed of a polymeric material and is held against axial movement under the influence of the biasing spring 66 by a plurality of resiliently deflectable gripper fingers 74. The gripper fingers 74 are integrally formed with the liner 46 and extend axially outwardly from a circular outer end face or rim 76 of the liner 46 into engagement with an annular wall 78 of the base member 68. The annular wall 78 of the base member 68 is connected with a generally cylindrical body section 80 of the base member by a plurality of spaced apart radially extending arms or spokes 82.

When the cartridge 42 is to be assembled, the movable valve member 56 is positioned in engagement with the annular valve seat 64. The coil spring 66 is then positioned against the guides 70 on the valve member 72. Inner surfaces 86 on the radially extending arms 82 are then pressed against the outer end of the coil spring 66. As this occurs, the annular wall 78 of the base member 68 engages sloping cam surfaces 88 on the resiliently deflectable fingers 74. Continued inward movement of the base member 68 causes the annular wall 78 to react with the cam surfaces 88 to resiliently deflect the fingers 74 inwardly toward the central axis 58 of the cartridge assembly 42. After the annular walls 78 have been moved inwardly of radially outwardly extending gripper surfaces 90 on the spring fingers 74, the spring fingers snap outwardly, under the influence of their own resilience, into gripping engagement with the base member 78 to hold the base member in the position shown in FIG. 2. it should be noted that at this time the biasing spring 66 is partially compressed between the outwardly extending guide 70 on the movable valve member 56 and the radially extending surfaces 68 on the arms 82 of the base member 68 to press the seal cap 60 against the valve seat 64.

Once the cartridge 42 has been assembled in this manner, it forms a unit which can be readily pretested and/or mounted in the valve housing 28 with a minimum of difficulty. When the cartridge 42 is to be mounted in the valve housing 28, a leading or outer end portion of the cartridge assembly is inserted through a circular inner opening 94 to the housing cavity 44. As the external threads 48 on the liner 46 engage the internal threads 50 on the housing 28, a tool is inserted into a rectangular opening 96 at the inner end of the liner 46 and is rotated to screw the cartridge 42 into the housing 28. The preassembled cartridge 42 not only facilitates the assembly of relief valve 12 but also enables the cartridge to be readily removed from the valve housing 28 and a replacement cartridge inserted if for some unforeseem reason the cartridge 42 should become damaged during use of the container 10.

When the container 10 is to be filled, the cover 18 is removed and a liquid, such as soft drink syrup, is placed in the container 10. The cover 18 is then connected with the container 10 and the interior of the container is charged with gas to the desired pressure through the connection 20. This initial charge pressure is applied against the circular end face 62 of the movable valve 56 and is ineffective to move the valve 56 against the influence of the biasing spring 66.

If the interior of the container 10 should be charged to a pressure greater than the desired pressure due to a malfunctioning of the charging apparatus or other reason, the fluid pressure against the end face 62 of the valve member 56 is effective to move the valve member axially toward the right from the closed position shown in FIG. 2 to the open position shown in FIG. 3 against the influence of the biasing spring 66. As this occurs, gas will flow from the interior of the container 10 through the liner cavity 54 and base member 68 to the circular opening 38 in the outer end portion 34 of the housing 28 in the manner illustrated by the arrows 100 in FIG. 3.

During movement of the valve member 56 from the closed position of FIG. 2, to the open position of FIG.

3, the radially extending guides 70 on the valve member cooperate with a cylindrical inner surface 102 of the liner cavity 54 to guide movement of the valve member. In addition, a cylindrical inner surface 104 on the central portion 80 of the base member 68 engages a cylindrical outer surface 106 on a stem 108 of the valve member to further guide the axially outward movement of the valve member 56. When the valve member 56 has reached the fully opened position, a circular end face 110 on the central portion 80 of the base member 68 engages a circular end face 112 on the stem 108 to limit the outward movement of the valve member 56. Of course, when the fluid pressure in the container 10 has dropped to the desired level, the biasing spring 66 is effective to move the valve member 56 from the open position of FIG. 3 back to the closed position of FIG. 2.

During the use of the container 10, the inner portions of the housing 28 and the cartridge 42 are exposed to the liquid in the container. If the joint between the liner 46 and housing 28 were exposed to this liquid, the liquid would seep into the crack between the liner and housing and in the cracks between the mating thread convolutions 48 and 50. This would tend to promote the growth of bacteria in the cracks and crevices between the liner 46 and housing 28. In addition, the cartridge 42 and housing cavity 44 are exposed to dirt and other foreign particles in the atmosphere through the opening 38 in the outer end portion of the housing. If the thread convolutions 48 and 50 were exposed to this dirt and contaminants, the growth of bacteria between the thread convolutions would be further promoted. Since it is contemplated that the container 10 will be utilized to hold soft drink syrups which are used directly from the container with a minimum of processing, it is necessary to eliminate the growth of bacteria in association with the relief valve 12.

To prevent the growth of bacteria in the cracks and crevices between liner 46 and housing 28, seals are provided between the liner and the housing at the axially inner and outer ends of the liner. The seal between the inner end of the liner and the housing prevents the thread convolutions 48 and 50 from being exposed to the liquid in the container. Similarly, the seal between the outer end of the liner and the housing prevents the thread convolutions 48 and 50 from being exposed to contaminants in the atmosphere around the container.

The seal at the inner end portion of the liner 46 is formed between a frustroconical inner end 116 of the liner and a frustroconical inner surface 120 of the housing cavity 44 (see FIG. 4). The frustroconical end portion 116 could be formed with the same angular slope as the slope of the frustroconical surface 120 so that the surface 118 on the liner would be in flat abutting engagement with a frustroconical housing surface 120. However, a positive fluid tight seal is advantageously obtained between the end of the liner 46 and the housing 28 by forming the frustroconical surface 116 of the liner with a different slope or angularity than the slope or angularity of the frustroconical housing surface 120. This is illustrated in FIG. 4 in which the frustroconical surface 118 of the liner 46 extends at a first acute angle 124 relative to the central axis 58 of the liner 46 while the frustroconical surface 120 of the housing opening 94 extends at a second angle 126 relative to the central axis 58 of the housing and liner.

The liner surface 118 extends at a somewhat larger angle 124 relative to the central axis 58 than does the housing 120. In one specific preferred embodiment of the invention, the frustroconical liner surface 118 extended at an angle 124 of approximately 32° relative to the central axis 58 while the frustroconical surface 120 of the housing 28 extended at an angle 126 of approximately 30° relative to the central axis 158 of the housing. It should be understood that the foregoing specific angles are for purposes of clarity of illustration only and that different angles could be used if desired.

The different slopes of the surfaces 118 and 120 causes an annular end corner 130 on the liner 46 to move into abutting engagement with the surface 120 of the housing 28 as the threads 48 and 50 engage each other. continued rotation of the liner 46 by a tool inserted into the opening 96 causes the annular corner 130 to be compressed firmly against the surface 120 to provide a secure fluid tight seal between the end of the liner and the housing 28. It should be noted that the corner 130 results in the formation of a positive fluid tight annular seal between a short length of the surface 118 and the surface 120 at the outermost end portion of the liner 46 to thereby prevent the threads 48 and 50 from being exposed to the liquid in the container.

A second seal 133 is formed between the axially outer end portion of the liner 46 adjacent to the circular rim 76. To form the seal 133, an annular bend 134 is formed on the outside of the liner 46. The bead 134 has an initial outside diameter which is slightly greater than the diameter of a cylindrical internal housing surface 136. As the cartridge 42 is moved axially into the housing cavity 44 by the interaction between the threads 48 and 50, the bead 134 moves axially along a cam surface 138 and is resiliently compressed to the diameter of the surface 136. Therefore, continued inward movement of the cartridge 42 results in the bead 134 forming a tight seal with the surface 136 to prevent exposure of the thread convolutions 48 and 50 to dirt and other foreign particles in the environment around the container 10.

It is contemplated that the container 10 will, from time to time, be refilled with liquid. The liquid with which the container 10 is refilled may differ in composition from the liquid which was initially held within the container. After the container has been emptied both the interior and the exterior portions of the relief valve 12 may be exposed to contaminants. Therefore, it is necessary to clean the relief valve assembly 12 between fillings of the container 10. Cleaning of the relief valve assembly 12 prevents the growth of bacteria in connection with the various components of the relief valve assembly.

Figure 6:
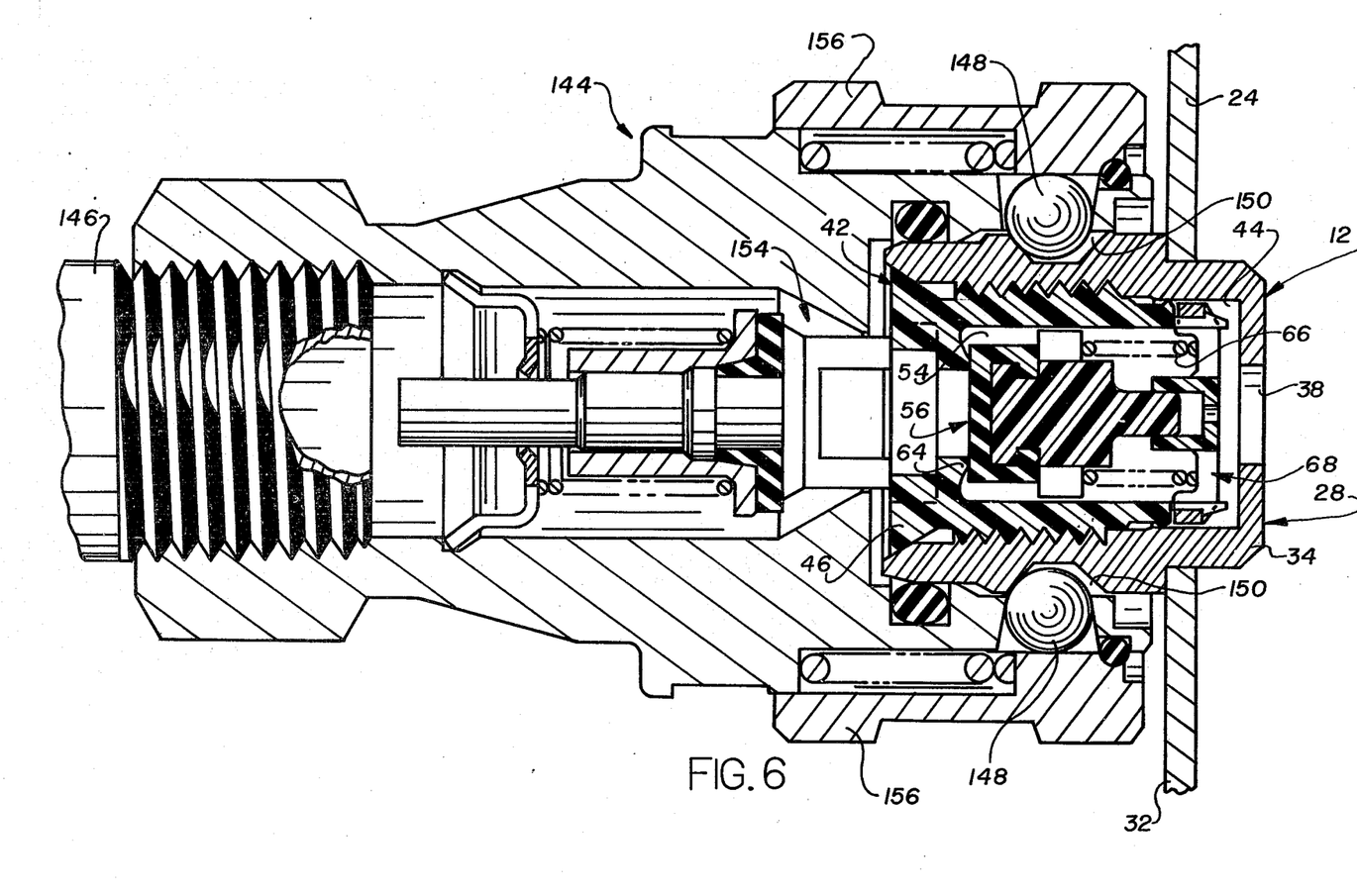
FIG. 6 is a sectional view illustrating the manner in which a socket assembly on a conduit connected with a source of cleansing fluid is connected with the relief valve assembly.

To facilitate the cleaning of the relief valve assembly 12, the inner portion of the housing 28 is advantageously formed as the plug element of a coupling. A socket element 144 of the coupling is connected with a conduit 146 leading to a source of cleansing fluid under pressure. Upon connection of the socket 144 with the valve housing 28 in the manner illustrated in FIG. 6, the socket is firmly locked to the valve housing by engagement of spherical locking balls 148 in the socket 144 with an annular groove 150 formed in the outside of the housing 28.

Once this connection has been made, a valve (not shown) is opened, and cleansing liquid under pressure can flow from a suitable source through the conduit 146 and open socket valve 154 to the relief valve assembly 12. The cleansing liquid is under a sufficient pressure to cause the relief valve assembly 12 to be actuated from the closed position of FIG. 6 to the open position of FIG. 5. When this occurs, the cleansing solution flows through the liner cavity 54 of the open relief valve 12, around the movable valve member 56 and through the base member 68 to the opening 38 in the housing 28 in the manner illustrated by the arrows 100 in FIG. 3. This flow of cleansing solution washes the surfaces of the relief valve assembly which are exposed to contaminants from the environment around the container 10 and to the liquid within the container.

Once the relief valve assembly 12 has been thoroughly flushed with the cleansing fluid, the suitable control valve is closed to interrupt the flow of cleansing fluid through the conduit 46. The socket assembly 144 is then disconnected from the relief valve 12 by retracting a cylindrical locking sleeve 156 to release the locking balls 148 for movement out of the annular groove 150. Of course, once the flow of cleansing liquid is interrupted, the biasing spring 66 will be effective to close the relief valve 12. After the socket assembly 144 has been disconnected from the relief valve 12, the exterior of the relief valve housing 28 and the cover 18 will be cleaned in a known manner. Although it is contemplated that the socket assembly 144 could have many different constructions, the socket assembly is advantageously constructed in a manner similar to that shown in U.S. Pat. No. 3,245,423.

A second embodiment of the relief valve assembly is illustrated in FIG. 7. The relief valve assembly of FIG. 7 is generally similar to the relief valve assembly illustrated in FIGS. 1–6. However, the relief valve assembly of FIG. 7 is primarily disposed on the outside of the container cover and has side slots to allow for draining and flushing of the relief valve assembly during cleaning of the cover and without taking the relief valve assembly apart. Since the relief valve assembly of FIG. 7 is generally the same as the relief valve assembly of FIGS. 1–6, similar numerals will be utilized to designate similar components, the suffix letter "a" being associated with the numerals utilized in connection with the relief valve assembly of FIG. 7 to avoid confusion.

The relief valve assembly 12a (see FIG. 7) includes a stainless steel housing 28a which is fixedly mounted on the wall of a cover 18a. The housing 28a has a circular shoulder 30a which engages the cover. The housing 28a extends through a circular opening in the cover and is exposed to the atmosphere surrounding the container. The outer end portion of the housing 28a has a circular exhaust opening 38a through which fluid pressure is exhausted to the atmosphere when the relief valve assembly 12a is operated from a closed position (illustrated in FIG. 7) to an open position under the influence of excessive fluid pressure within a container.

The relief valve assembly 12a includes a cartridge assembly 42a which is removably mounted within a generally cylindrical housing cavity 44a. The cartridge assembly 42a includes a generally cylindrical liner 46a formed of a polymeric material and having external thread convolutions 48a which engage internal thread convolutions 50a formed in the housing 28a. The liner 46a has a generally cylindrical valve cavity which is disposed in a coaxial relationship with the housing cavity 44a and the internal and external thread convolutions 48a and 50a.

An axially movable valve member 56a is disposed along the central axis of the valve cavity and housing cavity 44a. The valve member 56a is made of a polymeric material and is provided with a removable elastomeric seal cap which sealingly engages an annular valve seat 64a which is integrally formed with the liner 46a.

When the movable valve member 56a is in the closed position of FIG. 7, fluid flow through the relief valve assembly 12a is blocked by sealing engagement of the movable valve member with the valve seat 64a.

The movable valve member 56a is urged toward the closed position of FIG. 7 under the influence of a coil spring 66a. The coil spring 66a is disposed between a base member 68a and radially outwardly projecting guides 70a formed on the body of the movable valve member 56a. The base member 58a is formed of a polymeric material and is held against axial movement under the influence of the biasing spring 66a by a plurality of resiliently deflectable gripper fingers 74a. The gripper fingers 74a are integrally formed with the liner 46a and extend axially outwardly from an outer end face or rim of the liner 46a into engagement with the outside of the base member 68a.

If the interior of the container with which the relief valve assembly 12a is associated is charged to a greater pressure than the desired pressure due to a malfunctioning of the charging apparatus or other reasons, the fluid pressure at the end face of the valve member 56a is effective to move the valve member axially toward the right from the closed position shown in FIG. 7 to an open position in which it is spaced apart from the valve seat 64a. As this occurs, gas will flow from the interior of the container, around the valve seat 64a and outwardly through a pair of arcuate slots 159 formed in the liner 46a and a pair of arcuate slots 160 formed in the housing 28a. If desired, the slots 159 and 160 could be replaced by openings having a different configuration.

During movement of the valve member from the closed position to the open position, the radially extending guides 70a in the valve member cooperate with the cylindrical inner surface of the liner cavity to guide movement of the valve member 56a. In addition, a central portion 80a of the base member 68a engages a cylindrical outer surface on the stem of the valve member to further guide axially outward movement of the valve member 56a. When the valve member 56a has reached a fully opened position, a circular end face on the central portion 80a of the base member 68a engages a circular end face on the valve stem to limit outward movement of the valve member 56a. Of course, when the fluid pressure in the container has dropped to the desired level, the biasing spring 66a is effective to move the valve member 56a from the open position back to the closed position of FIG. 7.

To prevent the growth of bacteria in the cracks and crevices between the liner 46a and housing 28a, seals are provided between the liner and the housing. A seal at the inner end portion of the liner 46a is formed between a frustroconical inner end 116a and a frustroconical inner surface 120a of the housing 28a. The frustroconical end portion 116a could be formed at the same angular slope as the slope of the frustroconical surface 120a. However, a positive fluid tight seal is advantageously obtained between the end of the liner 46a and the housing 28a by forming the frustroconical surface 116a of the liner with a different slope or angularity than the slope of the frustroconical housing surface 120 in the manner previously explained in connection with FIG. 4.

A second seal is provided between the liner and the housing to prevent foreign materials from entering the joint between the liner and housing at the arcuate slots 160. Thus, an annular bead 164 is formed on the liner 46a and it sealingly engages a cylindrical inner surface of the housing to seal the joint in the housing and liner against the entry of foreign particles.

Another seal is also provided at the axially outer portion of the slot 160 and the liner 46a. This seal is formed by an annular bead 166 on the liner 46a. The annular bead 166 has a diameter which is slightly greater than the diameter of the cylindrical surface of the valve cavity 54a and therefore provides for tight sealing engagement between the circular bead 166 and the cylindrical surface. An axially outermost seal 133a is formed on an axially outer and upper end portion of the liner 46a. To form the seal 133a, an annular bead is formed on the liner 46a. This bead has an initial outside diameter which is slightly greater than the diameter of the cylindrical surface of the cavity 54a. As the cartridge 42a is moved axially into the housing cavity 44a by the interaction between the threads 48a and 50a, this bead moves axially along a cam surface and is resiliently compressed to the diameter of the valve chamber cavity 54a. Therefore, the bead on the outside of the housing member 46a provides a fluid tight seal between the housing member and the liner. It should be noted that the threads 48a and 50a are disposed between the seals 133a and 166 so that foreign particles can not enter the cracks between the threads.

By utilizing the four seals 116a, 164, 166 and 133a, the relief valve assembly 12a can be cleaned without disassembling the relief valve assembly. This is accomplished by spraying both the inner and outer end portions of the housing 12a with a suitable cleansing liquid. The cleansing liquid enters the exhaust opening 38a and flows through openings (not shown) in the base member 68a. The cleansing liquid flows around the valve member 56a and out of the slots 160.

The two annular seals 166 and 133a prevent the cleansing liquid from entering the joint between the liner 46a and the housing 12a. The annular seal 164 prevents the cleansing solution from entering the joint between the liner 46a and the housing 12a at the axially inner side of the slots 160. The axially inner end portion of the relief valve assembly 12a is also sprayed with a cleansing liquid to clean the inner end portion of the liner 46a and valve member 56a. The seal 116a prevents this liquid from entering the joint between the liner 46a and housing 12a.

In view of the foregoing, it can be seen that the relief valve assemblies 12 and 12a include housings 28 and 28a which are fixedly mounted on the container covers 18 and 18a and liners 46 and 46a which are threaded into cavities 54 and 54a in the housings. Seals are provided at the opposite ends of the liners 46 and 46a to prevent the threads from being exposed to the dirt and other foreign particles in the atmosphere around the container. In addition seals are provided to prevent the joints between the liners 46 and 46a and the housings 28 and 28a from being exposed to the liquid within the container to thereby retard the growth of bacteria.

In addition to the liners 46 and 46a and housings 28 and 28a, the relief valve assemblies 12 and 12a include movable valve elements 56 and 56a and biasing springs 66 and 66a which are disposed within the liners. Installation of the liners 46 and 46a, valve members 56 and 56a and biasing springs 66 and 66a in the housings 28 and 28a are facilitated by the use of base or end members 68 and 68a to hold the movable valve members and springs in cavities in the liners. These base or end members 68 and 68a are releasably connected with the liners 46 and 46a by resiliently deflectable fingers 74 and 74a which extend from end portions of the liners.

The relief valve housing 28 has an external configuration corresponding to the configuration of a plug element of a plug and socket assembly. A conduit 146 connected with a source of cleansing fluid can be connected with the relief valve assembly 12 by merely connecting a socket 144 at one end of the conduit to the housing 28 for the relief valve assembly. High pressure cleansing fluid can then flow through the conduit 146, socket 144 and relief valve assembly 12 to clean the parts of the relief valve assembly with a minimum of difficulty.

Having described one specific preferred embodiment of the invention, the following is claimed:

1. A relief valve assembly for use in association with a container of pressurized liquid, said relief valve assembly comprising a housing connected with the container and having an outer end portion which is at least partially exposed to the atmosphere around the container and an inner end portion which is at least partially exposed to the liquid in the container, said housing including surface means defining an axially extending housing cavity and internal threads within said housing cavity, a liner disposed within said housing cavity and having external threads disposed in engagement with said internal threads, said liner including surface means defining an axially extending liner cavity having an inner opening exposed to the liquid in the container, an outer opening exposed to the atmosphere surrounding the container, and a valve seat disposed between said inner and outer liner cavity openings, a valve member disposed within said liner cavity and movable between a closed position blocking fluid flow through said valve seat and an open position enabling fluid to flow from said inner liner cavity opening through said valve seat to said outer liner cavity opening, spring means for urging said valve member toward the closed position, said valve member being movable from the closed position toward the open position against the influence of said spring means by the fluid pressure in the container when the fluid pressure in the container exceeds a predetermined pressure to thereby exhaust at least a portion of the fluid pressure in the container to the atmosphere surrounding the container, said liner including first and second circular seals disposed in sealing engagement with axially spaced apart portions of said housing, said internal and external threads being disposed between said first and second circular seals to prevent exposure of said internal and external threads to foreign particles.

2. A relief valve assembly as set forth in claim 1 wherein said surface means defining said axially extending housing cavity includes a first frustroconical surface disposed in a coaxial relationship with said internal threads and extending at a first angle to the central axis of said housing cavity, said liner including a second frustroconical surface disposed in a coaxial relationship with said external threads and extending at a second angle to the central axis of said housing cavity, an annular portion of said second frustroconical surface being held in abutting pressure engagement with an annular portion of said first frustroconical surface to provide sealing engagement between said liner and said housing.

3. A relief valve assembly as set forth in claim 2 wherein said second angle is of a greater magnitude than said first angle.

4. A relief valve assembly as set forth in claim 2 wherein said second frustroconical surface at least partially defines one of said circular seals.

5. A relief valve assembly as set forth in claim 2 wherein said second frustroconical surface is axially spaced apart from said first and second circular seals.

6. A relief valve assembly as set forth in claim 1 wherein said surface means defining said axially extending housing cavity includes a cylindrical surface disposed axially outwardly of and in a coaxial relationship with said internal threads, said second circular seal including an annular bead which is disposed in coaxial relationship with said external threads and is deflectable from an initial diameter to a second diameter which is smaller than said initial diameter by said cylindrical surface of said housing upon threaded engagement of said internal and external threads.

7. A relief valve assembly as set forth in claim 1 further including a plurality of resiliently deflectable fingers extending axially outwardly from an end portion of said liner toward the outer end of said housing cavity, and base means disposed in engagement with said fingers for limiting axial movement of said valve member in a direction away from said valve seat, said fingers including surface means engaging said base means for holding said base means against movement in a direction away from said valve seat.

8. A relief valve assembly as set forth in claim 7 wherein said base means including guide surface means engaging said valve member for guiding movement of said valve member between the open and closed positions.

9. A relief valve assembly as set forth in claim 7 wherein said spring means includes a coil spring having an outer end portion disposed in engagement with said base means and an inner end portion disposed in engagement with said valve member.

10. A relief valve assembly as set forth in claim 1 wherein said housing includes annular external surface means defining an annular groove for receiving locking elements of a socket assembly upon connection of the socket assembly to said relief valve assembly.

11. A relief valve assembly for use in association with a container of pressurized liquid, said relief valve assembly comprising a housing connected with the container and having an outer end portion which is at least partially exposed to the atmosphere around the container and an inner end portion which is at least partially exposed to the liquid in the container, said housing including surface means defining an axially extending housing cavity, a liner disposed within said housing cavity and having an external surface disposed in engagement with said surface means, said liner including surface means defining an axially extending liner cavity having an inner opening exposed to the liquid in the container, an outer opening exposed to the atmosphere surrounding the container, and a valve seat disposed between said inner and outer liner cavity openings, a valve member disposed within said liner cavity and movable between a closed position blocking fluid flow through said valve seat and an open position enabling fluid to flow from said inner liner cavity opening through said valve seat to said outer liner cavity opening, spring means for urging said valve member toward the closed position, said valve member being movable from the closed position toward the open position against the influence of said spring means by the fluid pressure in the container when the fluid pressure in the container exceeds a predetermined pressure to thereby exhaust at least a portion of the fluid pressure in the container to the atmosphere surrounding the container, said liner including a plurality of axially extending fingers projecting from an outer end portion of said liner toward said outer end portion of said housing, said fingers being resiliently deflectable between first and second positions, base means for limiting axial movement of said valve member relative to said liner, each of said fingers including gripper surface means for engaging said base means and retaining said base means against axial movement relative to said liner in at least one direction when said fingers are in said first position, said gripper surface means on each of said fingers being ineffective to retain said base means against axial movement relative to said liner when said fingers are in said second position, said spring means being disposed in said liner cavity between said valve member and said base means.

12. A relief valve assembly as set forth in claim 11 wherein said base means includes guide surface means for guiding movement of said valve member between the open and closed positions.

13. A relief valve assembly as set forth in claim 11 wherein said liner includes a first annular surface disposed in sealing engagement with said housing at a location adjacent to said inner end portion of said housing to block liquid flow from the container along a path extending between said external surface of said liner and said housing, said liner including a second annular surface disposed in sealing engagement with said surface means defining said housing cavity at a location adjacent to an outer end portion of said housing to block movement of foreign particles along a path extending between said external surface of said liner and said housing.

14. A relief valve assembly as set forth in claim 11 wherein said surface means defining said axially extending housing cavity includes a frustroconical housing surface which is coaxial with and extends at a first angle to the central axis of said housing cavity, said external surface of said liner including a frustroconical liner surface extending at a second angle to and disposed in a coaxial relationship with the central axis of said housing cavity, at least a portion of said frustroconical liner surface being disposed in abutting engagement with said frustroconical housing surface.

15. A relief valve assembly as set forth in claim 14 wherein said second angle is of a greater magnitude than said first angle.

16. A relief valve assembly as set forth in claim 14 further including thread means for interconnecting said housing and said liner and for urging said frustroconical housing and liner surfaces into tight sealing engagement.

17. A relief valve assembly for use in association with a container of pressurized liquid, said relief valve assembly comprising a housing connected with the container and having an outer end portion which is at least partially exposed to the atmosphere around the container and an inner end portion which is at least partially exposed to the liquid in the container, said housing including a side wall having surface means defining an axially extending housing cavity and at least one opening disposed between said inner and outer end portions of said housing and exposed to the atmosphere around the container, said housing including surface means defining internal threads within said housing cavity, a liner disposed within said housing cavity, said liner including surface means defining an axially extending liner cavity having an inner opening exposed to the liquid in the container and at least one side opening aligned with the opening in the side wall of said housing and exposed to the atmosphere surrounding the container, and a valve seat disposed between said inner and side openings in said liner, said outer end portion of said housing including surface means for defining an opening connected in fluid communication with said liner cavity, said liner having external threads disposed in engagement with said internal threads, a valve member disposed within said liner cavity and movable between a closed position blocking fluid flow through said valve seat and an open position enabling fluid to flow from said inner liner cavity opening through said valve seat to said side opening in said liner, spring means for urging said valve member toward the closed position, said valve member being movable from the closed position toward the open position against the influence of said spring means by the fluid pressure in the container when the fluid pressure in the container exceeds a predetermined pressure to thereby exhaust at least a portion of the fluid pressure in the container to the atmosphere surrounding the container, said liner including first and second circular seals disposed in sealing engagement with axially spaced apart portions of said housing on opposite sides of the opening in the side wall of said housing to prevent foreign particles from entering between said liner and housing at the side opening in said liner and the opening in the side wall of said housing, a third circular seal disposed in sealing engagement with the inner end portion of said housing to prevent foreign particles from entering between said liner and housing at the inner end portions of said liner and housing, a fourth circular seal disposed in sealing engagement with said housing at a location axially outwardly of said first and second circular seals to prevent foreign particles from entering between said liner and housing, said first circular seal being disposed in sealing engagement with said housing at a location axially outwardly of the opening in the side wall of said housing, said internal and external threads being disposed between said first and fourth circular seals to prevent exposure of said internal and external threads to foreign particles.

18. An assembly as set forth in claim 17 wherein said surface means defining an axially extending liner cavity includes means for directing a flow of cleaning fluid from the opening in the outer end portion of said housing to the opening in the side wall of said housing.

19. An assembly comprising a cover adapted to be used in association with a container of pressurized liquid, a housing fixedly connected to said cover, said housing having an outer end portion which is at least partially exposed to the atmosphere around the container when said cover is connected with the container, said housing including a side wall at least partially defining an axially extending housing cavity having an open end portion connected in fluid communication with the inside of the container when said cover is connected with the container, said side wall including first surface means for defining internal threads in said housing cavity and second surface means for defining an opening in said side wall to connect said housing cavity in fluid communication with the atmosphere around the container when said cover is connected with the container, said opening being connected in fluid communication with said housing cavity at a location between said internal threads and said open end portion of said housing cavity, a liner disposed in said housing cavity and having external threads disposed in engagement with said internal threads, said liner including surface means defining a liner cavity having a first opening exposed to the pressurized liquid in the container when said cover is connected with the container, a second opening connected in fluid communication with the opening in the side wall of said housing and a valve seat disposed between the first and second openings in the liner cavity, a valve member disposed within said liner cavity and movable between a closed position blocking fluid flow through said valve seat and an open position enabling fluid to flow from said first liner cavity opening through said valve seat to said second liner cavity opening, biasing means in said liner cavity for urging said valve member toward the closed position, first seal means disposed between said liner and said housing adjacent to a first end portion of said external threads for blocking a flow of material between said housing and said liner adjacent to the first end portion of said external threads, second seal means disposed between said liner and said housing at a location between a second end portion of said external threads and the opening in the side wall of said housing for blocking a flow of material between said housing and said liner adjacent to said second end portion of said external threads and the opening in the side wall of said housing, and third seal means disposed between said housing and said liner adjacent to the opening in the side wall of said housing, said opening in the side wall of said housing being connected in fluid communication with the second opening to the liner cavity along a flow path which extends between said second and third seal means.

20. A relief valve assembly for use in association with a container of pressurized liquid, said relief valve assembly comprising a housing connected with the container and having an outer end portion which is at least partially exposed to the atmosphere around the container and an inner end portion which is at least partially exposed to the liquid in the container, said housing including a side wall having surface means defining an axially extending housing cavity and at least one opening disposed between said inner and outer end portions of said housing and exposed to the atmosphere around the container, said housing including surface means defining internal threads within said housing cavity, a liner disposed within said housing cavity and having external threads disposed in engagement with said internal threads, said liner including surface means defining an axially extending liner cavity having an inner opening exposed to the liquid in the container and at least one side opening aligned with the opening in the side wall of said housing and exposed to the atmosphere surrounding the container, and a valve seat disposed between said inner and side openings in said liner, a valve member disposed within said liner cavity and movable between a closed position blocking fluid flow through said valve seat and an open position enabling fluid to flow from said inner liner cavity opening through said valve seat to said side opening in said liner, spring means for urging said valve member toward the closed position, said valve member being movable from the closed position toward the open position against the influence of said spring means by the fluid pressure in the container when the fluid pressure in the container exceeds a predetermined pressure to thereby exhaust at least a portion of the fluid pressure in the container to the atmosphere surrounding the container, said liner including first and second circular seals disposed in sealing engagement with axially spaced apart portions of said housing on opposite sides of the opening in the side wall of said housing to prevent foreign particles from entering between said liner and housing at the side opening in said liner and the opening in the side wall of said housing, and a third circular seal disposed in sealing engagement with said housing to prevent foreign particles from entering between said liner and housing, said first circular seal being disposed in sealing engagement with said housing at a location axially outwardly of the opening in the side wall of said housing, said internal and external threads being disposed between said first and third circular seals to prevent exposure of said internal and external threads to foreign particles.

21. A relief valve assembly comprising a housing, said housing including wall means defining an axially extending housing cavity having an outlet port, said wall means including internal threads disposed within said housing cavity, a liner disposed in engagement within said housing cavity and having external threads disposed in engagement with said internal threads, said liner including an axially extending body portion having inner surface means defining an axially extending liner cavity with first and second openings, said second opening being connected in fluid communication with said housing outlet port, and a valve seat disposed between said first and second liner cavity openings, a valve member disposed within said liner cavity and movable between a closed position blocking fluid flow through said valve seat and an open position enabling fluid to flow from said first liner cavity opening through said valve seat to said second liner cavity opening to said housing outlet port, biasing means for urging said valve member toward the closed position, said liner including first and second seals integrally formed with said body portion of said liner and disposed in sealing engagement with axially spaced apart portions of said housing, said internal and external threads being disposed between said first and second seals to prevent exposure of said internal and external threads to foreign particles.

22. A relief valve assembly as set forth in claim 21 wherein said wall means includes a first cylindrical portion disposed adjacent to a first end portion of said internal threads and a second cylindrical portion disposed adjacent to a second end portion of said internal threads, said first seal being disposed in sealing engagement with said first cylindrical portion and said second seal being disposed in engagement with said second cylindrical portion.

23. A relief valve assembly as set forth in claim 22 wherein said first cylindrical portion of said housing has an inside diameter which is less than the crest diameter of said internal threads and said second cylindrical portion of said housing has an inside diameter which is greater than the crest diameter of said internal threads.

24. A relief valve assembly as set forth in claim 21 wherein one of said first and second seals is disposed between said outlet port and an end portion of said internal threads.

25. An assembly for use in association with a container, said assembly comprising a housing connected with the container, said housing including surface means defining a housing cavity having an outer end portion with an opening therein connecting the housing cavity in fluid communication with the atmosphere outside the container, said housing having an inner end portion connected in fluid communication with the inside of the container, said housing having a side portion disposed between said inner and outer end portions and having an opening therein connecting the housing cavity in fluid communication with the atmosphere outside the container, a liner at least partially disposed within said housing cavity, said liner including surface means defining a liner cavity having an outer end portion with an opening therein connecting the liner cavity in fluid communication with the opening in the outer end portion of said housing, said liner having an inner end portion with an opening therein connecting the liner cavity in fluid communication with the inside of the container, said liner having a side portion disposed between the inner and outer end portions of said liner and having an opening therein connecting the liner cavity in fluid communication with the opening in the side portion of said housing, and valve means disposed in said liner cavity for at least partially controlling fluid flow from the inside of the container through said liner and housing to the outside of the container, said valve means being operable between a closed condition blocking fluid flow from the container through said liner and housing and an open condition enabling fluid to flow from the inside of the container to the outside of the container along a flow path which extends through the opening in the inner end portion of said liner, at least one of the openings in the side and outer end portions of said liner and at least one of the openings in the side and outer end portions of said housing, said opening in the side portion of said liner being connected in fluid communication with the opening in the outer end portion of said liner when said valve means is in the closed condition to enable a flow of cleaning fluid to be conducted between the opening in the outer end portion of said housing and the opening in the side portion of said housing to at least partially clean said housing and liner.

26. An assembly as set forth in claim 25 wherein said housing has internal threads disposed within said housing cavity, said liner has external threads disposed in engagement with said internal threads, said assembly further including seal means disposed between said liner and said housing at a location between said internal and external threads and the openings in the side portions of said liner and housing to block the flow of material between said housing and said liner.

27. An assembly as set forth in claim 25 further including thread means for connecting said liner with said housing, first seal means disposed between said liner and said housing adjacent to a first end portion of said thread means for blocking a flow of material between said housing and said liner adjacent to the first end portion of said thread means, second seal means disposed between said liner and said housing at a location between a second end portion of said thread means and the openings in the side portions of said housing and liner for blocking a flow of material between said housing and said liner adjacent to said second end portion of said thread means, and third seal means disposed between said housing and said liner adjacent to the openings in the side portions of said liner and housing, said opening in the side portion of said housing being connected in fluid communication with the opening in the side portion of said liner along a flow path which extends between said second and third seal means.

28. A relief valve assembly for use in association with a container of pressurized liquid, said relief valve assembly comprising a housing connected with the container and having an outer end portion which is at least partially exposed to the atmosphere around the container and an inner end portion which is at least partially exposed to the liquid in the container, said housing including surface means defining an axially extending housing cavity, a liner disposed within said housing cavity and having an external surface disposed in engagement with said surface means, said liner including surface means defining an axially extending liner cavity having an inner opening exposed to the liquid in the container, an outer opening exposed to the atmosphere through said outer end portion of said housing, and a valve seat disposed between said inner and outer liner cavity openings, a valve member disposed within said liner cavity and movable between a closed position blocking fluid flow through said valve seat and an open position enabling fluid to flow from said inner liner cavity opening through said valve seat to said outer liner cavity opening, spring means for urging said valve member toward the closed position, said valve member being movable from the closed position toward the open position against the influence of said spring means by the fluid pressure in the container when the fluid pressure in the container exceeds a predetermined pressure to thereby exhaust at least a portion of the fluid pressure in the container to the atmosphere surrounding the container, and drain port means formed through said housing and said liner adjacent said valve seat extending outwardly therefrom and positioned with the lowermost portion thereof beneath said valve seat; whereby cleaning fluid can be introduced through said outer end portion of said housing and drained through said drain port means.

* * * * *